INVENTORS
ALEX MESHBANE
FRANK VILARDI

INVENTORS
ALEX MESHBANE
FRANK VILARDI

BY Edward F. Levy
ATTORNEY

United States Patent Office 3,677,930
Patented July 18, 1972

3,677,930
ELECTROPHORESIS TESTING APPARATUS
Alex Meshbane, Syosset, and Frank Vilardi, Nesconset, N.Y., assignors to Savant Instruments, Inc., Hicksville, N.Y.
Filed Nov. 5, 1970, Ser. No. 87,169
Int. Cl. B01k 5/00
U.S. Cl. 204—299
12 Claims

ABSTRACT OF THE DISCLOSURE

A high voltage thermoelectrically cooled electrophoresis testing apparatus utilizing flat plate electrophoresis. The apparatus is an integrated unit including a high voltage supply, flat plate electrophoresis system and a thermoelectric cooler. These elements are combined in a single housing and may be used for immunoelectrophoresis and gel, paper, and thin layer electrophoresis.

BACKGROUND OF THE INVENTION

This invention relates to an electrophoresis testing apparatus, and more particularly to a compact testing apparatus integrating a flat plate electrophoresis system, a thermoelectric cooler, and a high voltage power supply.

The conventional electrophoresis testing apparatus generally includes a separate flat glass covered housing and a high voltage power supply. The housing consists of a flat hollow plate on either side of which are liquid troughs which are filled with conductive fluid. A sheet of paper or wick extends from each trough passing over the flat plate upon which are placed glass test slides. Since the ends of the paper are immersed in the conductive liquids in the trough, the paper is kept saturated and is electrically conductive. The glass slides are provided with wells for receiving drops of the liquid to be tested and an electroconductive buffer solution is placed on top of the test slides between the wicks for carrying the electric current over the wells which contain the material to be tested.

In a conventional system, the conductive liquid in the trough is connected to one terminal of the separate high voltage power supply, generally supplying 600–1000 volts with one trough serving as the anode and the other as the cathode. The current passes over the wells causing the test liquid in the wells of the paper to migrate, with the degree of the migration determining the analysis of the liquid. In such systems, the flat hollow plate must be cooled to maintain a constant temperature and for this purpose, cool water is circulated through the plate. A separate recirculating water cooler is utilized to provide this cooling action. Because the conventional system includes a separate flat, glass covered housing, high voltage supply, and recirculating water cooler, it is cumbersome and difficult to install. Further, because of the high voltage connection between the supply and the housing, significant safety hazards are encountered.

Further, in the conventional system, the troughs or buffer vessels which are used in conjunction with the flat plate for holding the electro-conductive liquid material are manually electrically wired to the terminals carrying the high voltage from the power supply. If, as frequently occurs, the electrical connection is imperfect, a dangerous condition is present because of the voltage magnitude supplied to the terminals. In addition, such electrical connections are time consuming to make and frequently difficult to perform because of the location of the terminals carrying the high voltage from the power supply to the buffer vessels or troughs.

Another of the disadvantages of the conventional electrophoresis testing apparatus is the lack of versatility due to the above-mentioned dangerous conditions. Such conventional testing apparatus frequently cannot be used in schools and universities because of the great possibility of injury and its cumbersome nature.

An object of the present invention is to provide a compact electrophoresis testing apparatus, which overcomes the disadvantages of the conventional systems.

Another object of the present invention is to provide an electrophoresis testing apparatus exhibiting greater safety features.

Still another object of the present invention is to provide an integrated electrophoresis testing apparatus which is functional, attractive and versatile.

Another object of the present invention is to provide a high voltage electrophoresis testing apparatus which is suitable to be used for immunoelectrophoresis and gel, paper and thin layer electrophoresis.

Another object of the present invention is to provide improved troughs or buffer vessels which contain electroconductive material which are easily removed from the testing apparatus and safely connected to the high voltage source.

Still another object of the present invention is to provide an electrophoresis testing apparatus which is less complicated in design and function thereby minimizing installation costs and maintenance problems.

Another object of the present invention is to provide a high voltage electrophoresis testing apparatus which is relatively light in weight and may be easily transported.

Other objects, advantages and features of the present invention will become more apparent from the following description.

SUMMARY OF THE INVENTION

In accordance with the principles of the present invention, the above objects are accomplished by providing a high voltage electrophoresis testing apparatus comprising a housing, a chassis support connected within said housing, a flat plate mounted on the chassis support, first and second buffer vessels located on either side of the plate, and a thermoelectric device mounted beneath the plate for providing an accurate temperature control over the surface of the plate. In addition, a solid state power supply is mounted within the housing providing the required electrical voltage for performing the electrophoresis testing. The integrated unit, including the plate, temperature control and power supply are all mounted within the housing providing a compact and lightweight electrophoresis testing apparatus.

DETAILED DESCRIPTION

Electrophoresis testing apparatus is used for the analysis of the complex organic substances such as the identification of amino acids in RNA, DNA, etc. The electrophoresis testing system finds wide use as a simple, effective and quick test for hepatitis in blood serum.

Figure 1:
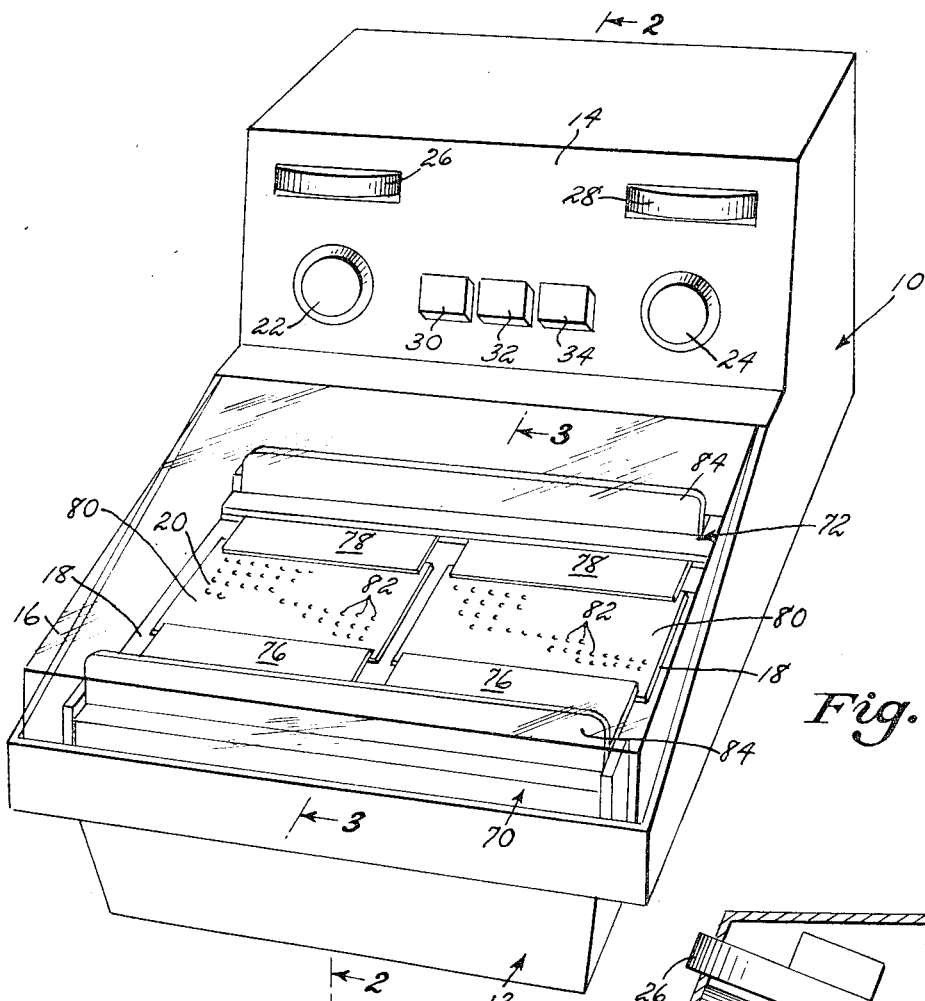
FIG. 1 is a perspective view of the high voltage electrophoresis testing apparatus of the present invention.

Referring now to FIG. 1, there is shown the electrophoresis testing apparatus of the present invention. The testing apparatus is an integrated unit including a high voltage power supply and a thermoelectric cooling system for maintaining a plate at a selected temperature. The integrated unit is provided with a housing 10, a base portion 12 and a front panel 14. A hinged glass or clear plastic cover or lid 16 is attached to the housing and is pivotable to an open position exposing a flat plate 18 and a closed position for covering the plate. The cover 16 is lifted to the open position enabling new test materials 20 to be placed on the plate after each test is completed. The plate 18 is made large enough to hold a plurality of glass testing slides placed thereon; in the embodiment of FIG. 1, two such glass slides being shown utilized for simultaneously providing a plurality of electrophoresis tests. Two control knobs 22 and 24 are mounted on front panel 14 for controlling the temperature and voltage respectively during the testing procedure. Two dial type meters 26 and 28 are also mounted on front panel 14 for indicating the current and voltage being utilized during the testing procedure. Three additional switches 30, 32 and 34 are mounted on the front panel, with switch 30 used to control the cooler power, switch 32 the high voltage and switch 34 the power to the testing apparatus.

Figure 2:
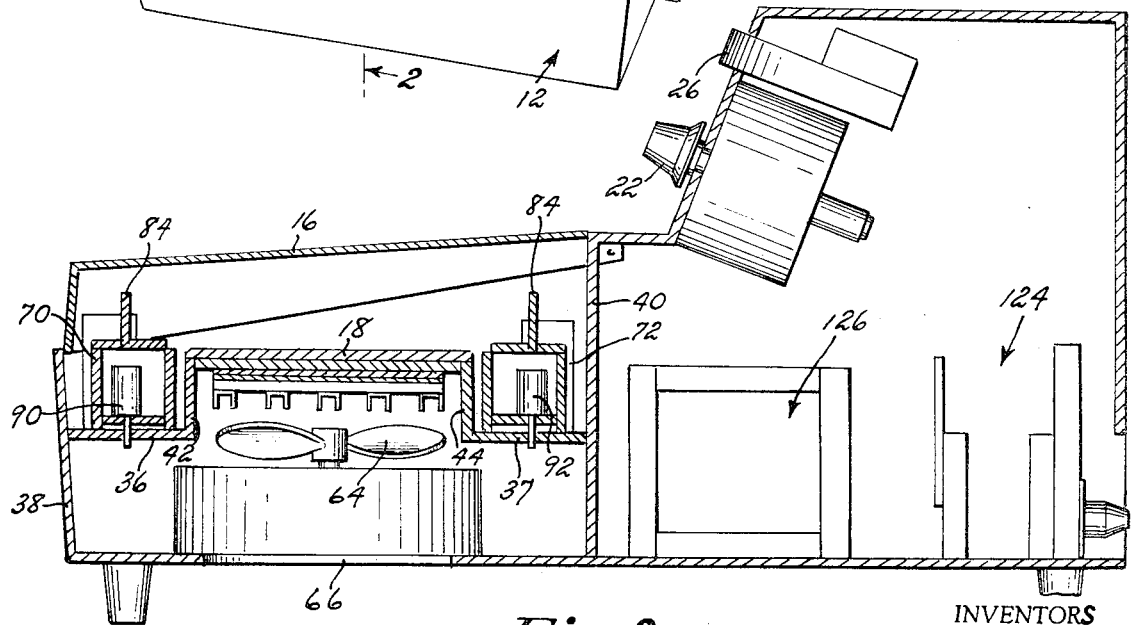
FIG. 2 is a sectional view taken along lines 2—2 of FIG. 1.
Figure 3:
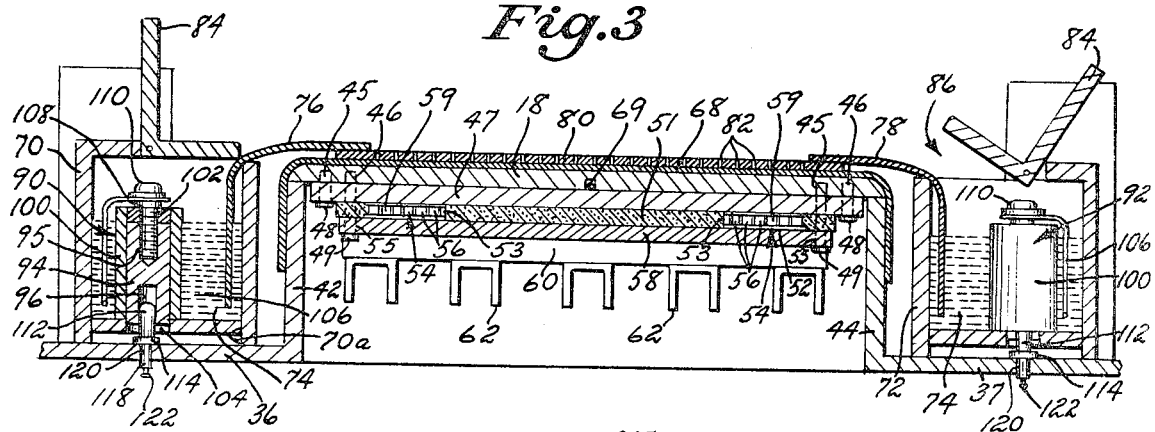
FIG. 3 is a sectional view taken along lines 3—3 of FIG. 1, illustrating the buffer vessels or trough and the flat plate carrying paper or a thin layer material.

FIGS. 2 and 3 present cross-sectional views of the testing apparatus of the present invention and illustrate the electrophoresis operation in more detail. Support members 36 and 37 are attached to a front vertical support wall 38 and an intermediate vertical support wall 40, respectively. Legs 42 and 44 are integrally formed with support members 36 and 37 and are bridged by flat plate 18. This integral support member forms an internal support chassis for the flat plate 18. The flat plate 18 is provided with threaded recesses 45 for enabling a thermally-conductive plate 47 to be attached to the bottom of the flat plate 18 with conventional screws 48. An insulating plate or sheet 51, made preferably of Styrofoam, is also secured beneath thermally-conductive plate 47 by means of conventional threaded screws 49 communicating with threaded recesses 46 on the bottom side of plate 18. The Styrofoam layer 51 is provided with apertures 53 through which thermoelectric devices or modules 54 are inserted to contact plate 47. These devices are rigidly secured to a heat dissipating member 58, provided with apertures 55 which align with the apertures in the Styrofoam plate or layer 51 enabling the heat dissipating member to be attached to flat plate 18 with the thermoelectric devices 54 mounted thereon.

The thermoelectric devices 54 are provided with a flat top surface 57 constituting a heat-transfer surface. Top surface 57 is in a facing relationship with thermally-conductive plate 47 to provide accurate temperature control over the entire surface of the plate 18. The thermoelectric device 54 also has a flat lower surface 52 to which is secured heat dissipating member 58.

The thermoelectric device 54 comprises a thermocouple assembly conventionally provided with a suitable number of semiconductor elements 56 arranged in oppositely-disposed pairs and connected in series in a well known fashion. When electrical current is passed through the thermocouple series in one direction, the upper portion of the module serves as a cold junction and the lower portion of the module serves as a hot junction. When the current direction is reversed, the upper portion serves as the hot junction and the lower portion as the cold junction. A heat insulating means is provided between the upper and lower portions to prevent the heat generated at the hot junctions from overtaking the cold prevailing at the cold junctions.

As shown in FIG. 3, the heat dissipating member 58 is mounted flush against the lower surfaces 52 of the thermoelectric modules 54; these lower surfaces normally constituting the hot junction. The heat dissipating member 58 is made of brass or other heat-conductive material and carries a lower flat plate portion 60, which in turn carries a plurality of depending vanes or fins 62. When the thermoelectric devices 54 are used for cooling the plate 18, the heat dissipating member 58 serves as a heat sink, the heat generated by the lower surfaces 52 of modules 54 being absorbed by member 58 and transferred through body portion 60 to the vanes 62, from which such heat is dissipated to the surrounding atmosphere. To augment such heat dissipation, an exhaust fan 64, shown in FIG. 2, is mounted below vanes 62, and is adapted to draw heat from the inside of the housing through an exhaust port 66 to the exterior of the housing.

The cooling or heating effect of the thermoelectric devices 54 is proportional to the currents passing through the devices, and the polarity of the voltage supply determines whether the thermoelectric device will heat or cool the flat plate 18. As a feature of the present invention, the temperature control is effected solely by the thermoelectric elements which have no moving parts, thereby minimizing maintenance problems. Further, the cooling system is integrally mounted within the housing, thereby eliminating the need for separate recirculating cool water systems. In addition, a precise control of temperature of the plate 18 is made possible, which is desirable in use of the apparatus. Illustratively, the temperature range of the electrophoresis testing apparatus is normally between 45° and 80° F.

As shown in FIG. 3, flat plate 18 is provided with an electrically insulating film 68 coated on the top of said plate and along legs 42 and 44. The film or layer 68 is formed by anodizing or ceramic coating and serves as an electrical insulator which allows electrophoresis to be run directly on the aluminum plate without the addition of insulating material, thereby further increasing the cooling efficiency of the assembly. In one commercial embodiment, flat plate 18 is made of aluminum with a machined surface and measures ¼ inch thick, 9 inches long and 5 inches wide. The aluminum plate may be coated black to allow viewing precipitin arcs when running immunoelectrophoresis setups. A thermistor 69 (FIG. 3) is embedded in the bottom of plate 18 to sense the temperature of the plate and is used in a bridge network which controls the temperature, as will be presently described.

Troughs or buffer vessels 70 and 72 are located on either side of the plate 18 and hold an electro-conductive fluid 74 such as a saline solution. These troughs 70 and 72 are removably mounted on the respective support members 36 and 37.

Extending from troughs or buffer vessels 70 and 72 are respective wicks 76 and 78 in the nature of absorbent paper strips. As shown in FIG. 3, one end of each wick 76, 78 is immersed in the conductive buffer fluid 74 within the respective trough, and the other end of each wick overlies the adjacent end of a glass testing plate 80 which is placed upon the flat plate 18. Where two or more glass plates 80 are employed for simultaneous electrophoretic testing, as shown in FIG. 1, each of said glass plates is engaged by a separate pair of wicks 76 and 78. In actual practice, the wicks are in the form of paper rolls rotatably mounted in the troughs 70, 72 and immersed in the buffer fluid 74 therein, and a strip is drawn from each of said rolls and brought into engagement with a glass plate 80 for each testing operation.

Each of the glass plates 80 is provided on its upper surface with a plurality of wells 82 in which the material to be tested is inserted. The glass plates 80 are then covered with a layer of buffer fluid similar to the conductive liquid in the troughs 70, 72. The wicks 76 and 78 are maintained saturated so that they replenish the buffer liquid on the surface of glass plates 80 and also conduct electrical current from the troughs 70, 72 to the surface of glass plates 80. A complete electrical path is thus formed between the troughs 70 and 72 over the glass testing plates 80 on flat plate 18. With the accurate temperature control for plate 18 described above, the electrophoresis testing is performed with current flowing through the testing liquid in the wells 82. One of the troughs forms an electrode and the other forms a cathode, as described below, and a voltage in the range of 0 to 400 volts is applied across the conducting wicks and buffer liquid. The test liquid in the wells migrates by electrophoresis action, with the degree of migration determining the analysis of the liquid.

Each of the troughs 70 and 72 is formed of a durable material such as Plexiglas and includes a cover 84 which may be pivoted to an open position, shown on the right hand side of FIG. 3 to present a large aperture 86 for filling the troughs and inserting and withdrawing the wicks without spillage.

In accordance with a feature of the present invention, an improved electrical connection is provided between the troughs and the source of high voltage. The troughs 70 and 72 are provided with respective electrodes 90 and 92, each of which is electrically connected to one terminal of the high voltage supply. FIG. 3 illustrates the construction of electrode 90 which is identical to the electrode 92. Electrode 90 includes a conductive core 94 in the nature of a solid cylindrical metal member having a threaded bore 95 in its top end and a bore 96 in its bottom end. Bore 96 is sized to receive and frictionally retain an electrical plug 98. The conductive core 94 is enclosed by an electrically insulative sleeve member 100 having an aperture 102 in the top wall thereof. The sleeve member 100 has an open bottom open end secured to the bottom wall 70a of trough 70, in registry with a circular opening 104 in said bottom wall. An electrode strip 106 of inverted U-shaped configuration straddles the sleeve member 100 and is spaced from the top wall thereof by a washer 108. A bolt 110 extends through an aperture in the strip 106, and through washer 108, into the threaded bore 95 to secure the strip 106 to the core 94 and provide electrical contact therebetween.

Plug 98 comprises a tip or prong 112 which fits frictionally within bore 96, an intermediate collar 114 of insulating material, and a non-conductive body portion 118 which is secured within an aperture 120 in the support member 36. The plug 98 is permanently fixed in place while the vessel or trough, with its electrode, is removable.

A source of voltage is connected to a pin member 122 of the plug 98 and is carried to the buffer vessel through the plug, conductive core 94, bolt 100 and electrode strip 106. Each electrode strip 106 is an elongated conducting member immersed in the buffer liquid 74 held in the respective trough 70 or 72. When the voltage is applied to the plug 98, one of the electrodes 90, 92 serves as the anode while the other serves as the cathode. The electrical connection for the buffer vessels of the present electrophoresis testing apparatus provides significant advantages over the prior art. The buffer vessels are easily removable and replaceable, and readily plug into the respective plug members, thereby eliminating the cumbersome wiring techniques previously required. Assembly of the present apparatus also is correspondingly simplified.

In accordance with still another feature of the present invention, a solid state power supply 124 is mounted in the housing 10 behind the intermediate support wall 40 (FIG. 2). The solid state power supply 124 operates from a conventional AC wall outlet and provides a high voltage in the range of 0 to 400 volts which is connected between troughs 70 and 72 respectively. The power transformers for the power supply are mounted on the bottom of the housing and contained in an enclosure 126 also located behind the intermediate support wall 40.

Figure 4:
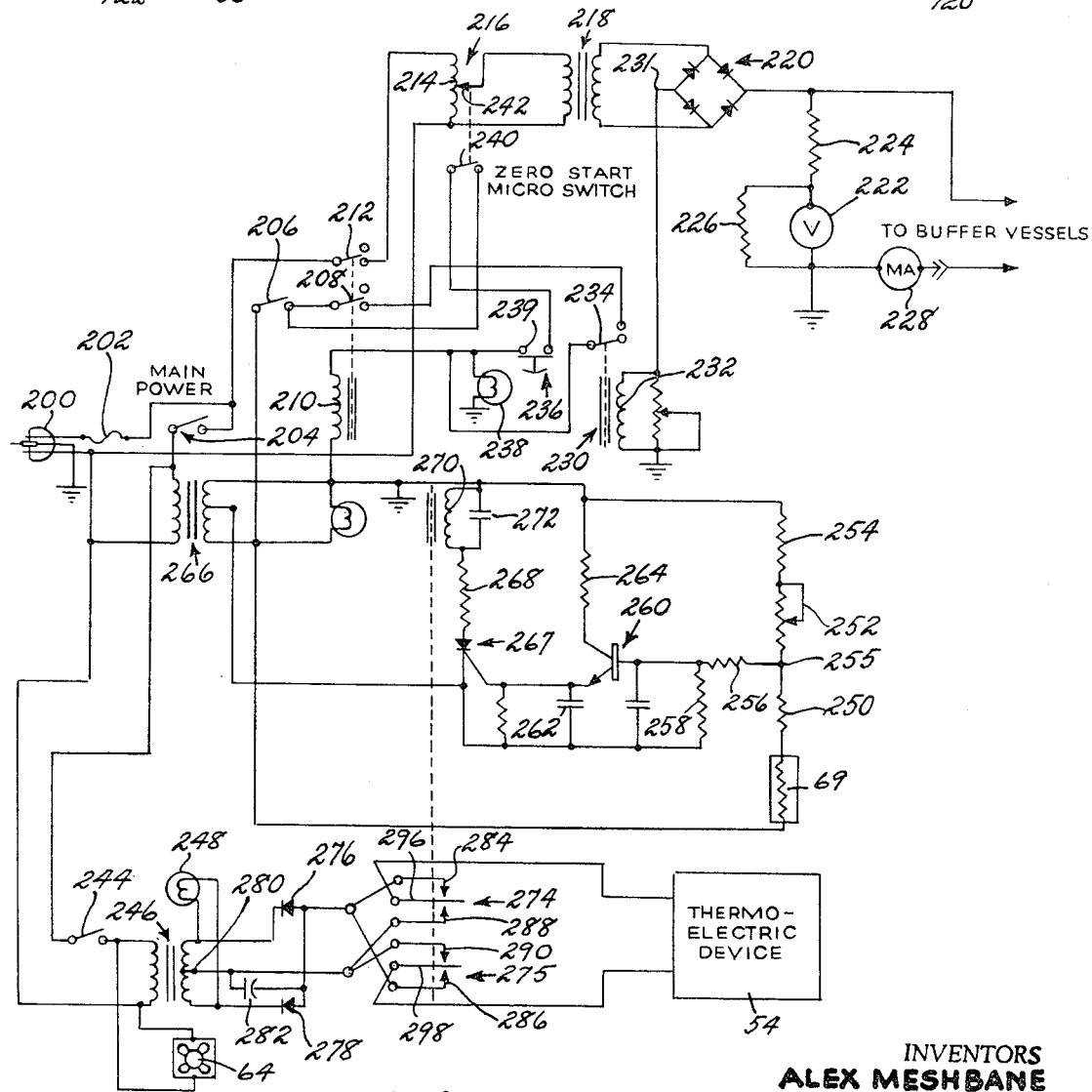
FIG. 4 is a schematic diagram of the electrical system used with the present invention.

FIG. 4 is a schematic diagram of the electrical system utilized in the present invention. A conventional plug 200 is inserted in a wall socket providing 120 volts for the electrical system. A fusing device 202 is connected between the plug and switch 204, which is normally in an open position. The electrical system is used for powering the fan 64, controlling the thermoelectric device and providing a relatively high voltage, between zero to 400 volts, to the buffer vessels.

As described above, the present apparatus is inoperative if the lid 16 is other than in a closed position. Lid switch 206 is connected in series with a normally open switch 208, controlled by a solenoid coil 210. Solenoid coil 210 also controls normally open switch 212 which, when in its closed position, carries the 120 volt input to the primary winding 214 of a powerstat 216 having a transformer 218 coupled to winding 214. A full wave rectifier diode bridge 220 is connected across the secondary of the transformer 218 and supplies a DC voltage which is measured by a voltmeter 222 connected to the output of the diode bridge through a resistor 224 with a current divider resistor 226 connected across voltmeter 222. The measured voltage is indicated on dial 28 on the front panel of the housing. An ammeter 228 is connected from one side of voltmeter 222 to the buffer vessel terminal to measure the current flowing thereto. The measured current level is displayed on dial 26 on the front panel.

The electrical system includes several safety interlocks for preventing erroneous operation of the testing apparatus. In particular, an overload relay 230 is connected to one side 231 of the diode bridge network 220 and senses when the current being supplied by the diode bridge is greater than a predetermined amount. A coil 232, connected to the bridge network, is energized when this current level is exceeded causing normally closed switch 234 to move to an open position. Switch 234 is connected through a high voltage set switch 236 with a power indicating light 238 connected between one of the contacts 239 of switch 236 and ground. High voltage switch 236 is connected in series with a zero start microswitch 240 which is coupled to and controlled by powerstat wiper arm 242 operated by voltage control knob 24 on the front panel. In order for the test apparatus to be energized the powerstat must start from a zero position thereby closing microswitch 240.

The test apparatus is energized by closing the lid switch 206, starting the powerstat at approximately a zero voltage level, and actuating the high voltage reset switch 236. If during the operation of the testing apparatus the cover is lifted causing the lid switch 206 to be opened, current through coil 210 is interrupted thereby causing switch 212 to be released and moved to its normal open position, thereby breaking the supply of voltage to powerstat 216 extinguishing the high voltage level supplied to the troughs 70 and 72.

The conventional 120 volts supplied through plug 200 is also applied across normally open cooler power switch 244 and the primary of a transformer 246. The fan is energized when switch 244 is closed and a lamp 248 is simultaneously energized indicating that the fan and thermoelectric devices are being energized.

As described above, the thermoelectric device heats or cools the plate 18 in response to the polarity of current flowing therethrough. The thermistor 69 forms a resistance bridge with a resistor 250, a variable resistor means or potentimeter 252 and a resistor 254. One junction 255 of the bridge network is connected through a resistor 256 to the base of a transistor 260, while a biasing resistor 258 is connected to the base of transistor 260. In addition, a capacitor 262 is connected across resistor 258 and to the base of transistor 260. This capacitor serves to minimize chatter in the relays controlled by transistor 260. A resistor 264 is connected between the collector of transistor 260 and the secondary of a 24 volt transformer 266.

When a desired temperature is set with potentiometer 252 on front panel 14 by knob 22, the resistance bridge network becomes unbalanced which causes transistor 260 to be turned off. The emitter of transistor 260 is connected to a gate electrode of a silicon controlled rectiger (SCR) 267, and the anode of the SCR is connected through a surge limiting resistor 268 to a coil 270 of a relay and to a capacitor 272 connected across the coil 270.

The thermistor senses the temperature of the plate and feeds such information back to the bridge network. Until the preselected temperature level is attained, the bridge network is unbalanced triggering SCR 267 into conduction which provides current through relay 270 closing double pole and double throw switches 274 and 275. As described above, the polarity of current supplied to the thermoelectric device will determine whether a heating or cooling effect is produced.

The secondary of transformer 246 is connected through back biased diodes 276 and 278 to contacts 284 and 286 of upper and lower double pole-double throw switches 274 and 275, respectively. A center tap connection 280 on the secondary of transformer 246 is connected to contacts 288 and 290 of upper and lower switches 274 and 275, respectively. A filter capacitor 282 is connected between center tap 280 and the junction between diodes 276 and 278. Normally, the contact arms 296 and 298 of switches 274 and 275 respectively touch contacts 288 and 286 providing a negative current flow for the thermoelectric device 54. When the resistance bridge is unbalanced the coil 270 is energized moving the contact arms 296 and 298 to their upper positions against contacts 284 and 290 providing a positive current flow for the thermoelectric device.

The electrical system for controlling the electrophoresis testing apparatus illustrated in FIG. 4 is but illustrative of one such embodiment for sensing the temperature of flat plate 18 and controlling the heating or cooling effect of the thermoelectric device 54. Other feedback arrangements may be utilized with the present testing apparatus for achieving a similar function. The double pole-double throw switches may easily be replaced by semi-conductor switch means, if desired, to minimize mechanical wear and tear and, possibly, prolong the life of the electrical apparatus.

It will thus be seen that the objects set forth above, among those made apparent from the preceding description, are efficiently attained and, since certain changes may be made in the above method and apparatus without departing from the scope of the invention, it is intended that all matter contained in the above description and shown in the accompanying drawings shall be interpreted as illustrative and not in a limiting sense.

What is claimed is:

1. An electrophoresis testing apparatus comprising a housing, a flat plate, a chassis support attached within said housing, said flat plate being supported by said chassis support, first and second troughs containing an electro-conductive liquid supported by said chassis support and being located at opposite ends of said flat plate, said first trough forming an anode and said second trough forming a cathode, first and second wick means connected between said first and second troughs and said flat plate, respectively, electro-conductive means connected between said first and second wicks, container means resting on said flat plate for holding a lqiuid to be tested and electrically connected to said anode and cathode through said wick, and thermoelectric control means for adjusting the temperature of the surface of said flat plate, said thermoelectric control means being mounted below said flat plate.

2. An electrophoresis testing apparatus as set forth in claim 1, including a high voltage power supply means for supplying a high voltage to said anode and cathode, said high voltage power supply means being mounted within said housing.

3. An electrophoresis testing apparatus as set forth in claim 2, wherein said high voltage power supply means comprises solid-state elements.

4. An electrophoresis testing apparatus as set forth in claim 1, wherein said thermoelectric control means is provided with a plurality of thermocouple modules, said thermocouple modules producing a temperature responsive to the magnitude and polarity of a current flowing throcgh said thermocouple modules, and means for controlling the polarity of said current.

5. An electrophoresis testing apparatus as set forth in claim 4, including a heat sink mounted beneath said thermoelectric device, said heat sink being provided with a flat thermally conducting plate and a plurality of vanes depending from said thermally conducting plate.

6. An electrophoresis testing apparatus as set forth in claim 5, including exhaust fan means being mounted within said housing below said plurality of vanes which is connected to power supply within housing.

7. An electrophoresis testing apparatus as set forth in claim 2, wherein said first and second troughs are provided with socket means, plug means being mounted on said chassis support and adapted to frictionally engage said socket means, said plug means being connected to said high voltage power supply means.

8. An electrophoresis testing apparatus as set forth in claim 1, including a source of power, a cover lid enclosing said flat plate, a switch controlled by said cover lid for connecting and disconnecting said apparatus from said source of power.

9. An electrophoresis testing apparatus as set forth in claim 1, including a source of power, a main power switch, adjustment means connected to said high voltage power supply for controlling the magnitude of the voltage supplied to said anode and cathode, said adjustment means being capable of controlling said magnitude from a level of zero volts to approximately 400 volts, switch means controlled by said adjustment means for connecting and disconnecting said apparatus from said source of power, said apparatus being disconnected from said source of power when said main power switch connects said apparatus to said source of power and said adjustment means is initially set to provide a voltage greater than approximately zero volts.

10. An electrophoresis testing apparatus as set forth in claim 1, wherein a temperature sensitive device is embedded in said flat plate for sensing the temperature of said plate.

11. An electrophoresis testing apparatus as set forth in claim 10, including a resistance bridge network including four branches, said temperature sensitive device forming one branch of said bridge network, a potentimeter for selecting the temperature of the surface of said flat plate, forming a second branch of said bridge network, said bridge network providing a signal when said temperature selected is different from said temperature sensed by said temperature sensitive device, said signal controlling the magnitude and polarity of current supplied to said thermoelectric control means.

12. An electrophoresis testing apparatus as set forth in claim 11, including a triggering means connected to said bridge network and switch means for supplying currents of opposite polarities to said thermoelectric control means, said switch means normally supplying current of one polarity, said triggering means being responsive to said signal causing said switch means to supply a current of an opposite polarity from said one polarity.

References Cited

UNITED STATES PATENTS

| 2,768,948 | 10/1956 | McDonald et al. | 204—180 S |
| 2,843,540 | 7/1958 | Ressler | 204—180 S |
| 3,402,118 | 9/1968 | Mutter | 204—180 S |

GERALD L. KAPLAN, Primary Examiner

A. C. PRESCOTT, Assistant Examiner

U.S. Cl. X.R.

204—180 G